(12) United States Patent
Moroi

(10) Patent No.: US 8,823,992 B2
(45) Date of Patent: *Sep. 2, 2014

(54) IMAGE HANDLING APPARATUS, IMAGE PROCESSING SYSTEM, IMAGE PROCESS CONTROLLING METHOD, AND IMAGE PROCESS CONTROLLING PROGRAM PRODUCT

(71) Applicant: Ricoh Company, Ltd., Ohta-ku (JP)

(72) Inventor: Shohhei Moroi, Kanagawa (JP)

(73) Assignee: Ricoh Company, Ltd., Ohta-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,718

(22) Filed: Sep. 24, 2013

(65) Prior Publication Data

US 2014/0022600 A1    Jan. 23, 2014

Related U.S. Application Data

(63) Continuation of application No. 13/103,702, filed on May 9, 2011, now Pat. No. 8,570,571, which is a continuation of application No. 11/436,698, filed on May 19, 2006, now Pat. No. 7,957,021.

(30) Foreign Application Priority Data

May 20, 2005    (JP) ................................. 2005-148830

(51) Int. Cl.
*G06F 3/12*       (2006.01)
*G06K 15/00*      (2006.01)
*H04N 1/00*       (2006.01)
*H04N 1/04*       (2006.01)
*H04N 1/42*       (2006.01)

(52) U.S. Cl.
USPC ......... 358/1.15; 358/1.16; 358/401; 358/474; 358/475

(58) Field of Classification Search
USPC .......... 358/1.15, 1.1, 1.2, 1.6, 1.16, 400, 474, 358/501, 537, 1.14, 1.18, 1.13, 401, 540, 358/405, 476, 452; 709/208, 201, 213, 217, 709/220, 219, 218, 223, 226, 230, 203, 232, 709/238; 707/607, 609, 705, 755, 770, 794, 707/795, 805, 818; 345/415, 156, 173, 501, 345/10, 661, 650, 594, 418; 715/200, 204, 715/243, 273, 700, 719, 734, 738, 762, 809, 715/808, 805
See application file for complete search history.

(56) References Cited

U.S. PATENT DOCUMENTS 5,956,483 A  *  9/1999  Grate et al. ................... 709/203
6,799,297 B2    9/2004  Ackaret
(Continued)

FOREIGN PATENT DOCUMENTS

EP    1 531 610 A2    5/2005
EP    1 758 364 A2    2/2007
(Continued)

*Primary Examiner* — Ngon Nguyen
(74) *Attorney, Agent, or Firm* — Oblon, Spivak, McClelland, Maier & Neustadt, L.L.P.

(57) ABSTRACT

An image handling apparatus is disclosed, including an operation panel, hardware resources, a transferring part, and an image generation controlling part. The transferring part transfers image handle information input at the input screen to an external apparatus. The image generation controlling part receives and parses image generation information for at least one of the hardware resources to execute an image generation based on the image handle information, from the external apparatus in response to an instruction of the image generation, so that at least one of the hardware resources executes the image generation.

20 Claims, 11 Drawing Sheets

(56) References Cited

U.S. PATENT DOCUMENTS

| | | |
|---|---|---|
| 2003/0011633 A1 | 1/2003 | Conley et al. |
| 2003/0011640 A1 | 1/2003 | Green et al. |
| 2004/0218208 A1 | 11/2004 | Akiyoshi et al. |
| 2005/0012940 A1 | 1/2005 | Matsuda |
| 2005/0047682 A1 | 3/2005 | Stevens et al. |
| 2005/0105135 A1* | 5/2005 | Takahashi ............... 358/1.18 |
| 2005/0108353 A1 | 5/2005 | Yamamotoa |
| 2005/0213132 A1* | 9/2005 | Uejo ........................ 358/1.13 |
| 2006/0077423 A1 | 4/2006 | Mathieson et al. |
| 2007/0097416 A1 | 5/2007 | Higashimura et al. |

FOREIGN PATENT DOCUMENTS

| | | |
|---|---|---|
| JP | 2000-125073 | 4/2000 |
| JP | 2002-152458 | 5/2002 |
| JP | 2005-269619 | 9/2005 |

* cited by examiner

```
<script language="JavaScript">
fanction ParameterSetting()
{
//Light Start key in green
System.LocalCGI.Setting.StartKeyDisabled=1
}
<script>
```
603

FIG.11

```
<script language="JavaScript">
fanction DoScan()
{
System.LocalCGI.ScanSetting.Resolution=300      6041a
...
System.LocalCGI.doScan(<URL>, " Post")         6041b
...
}
<script>
```
6041

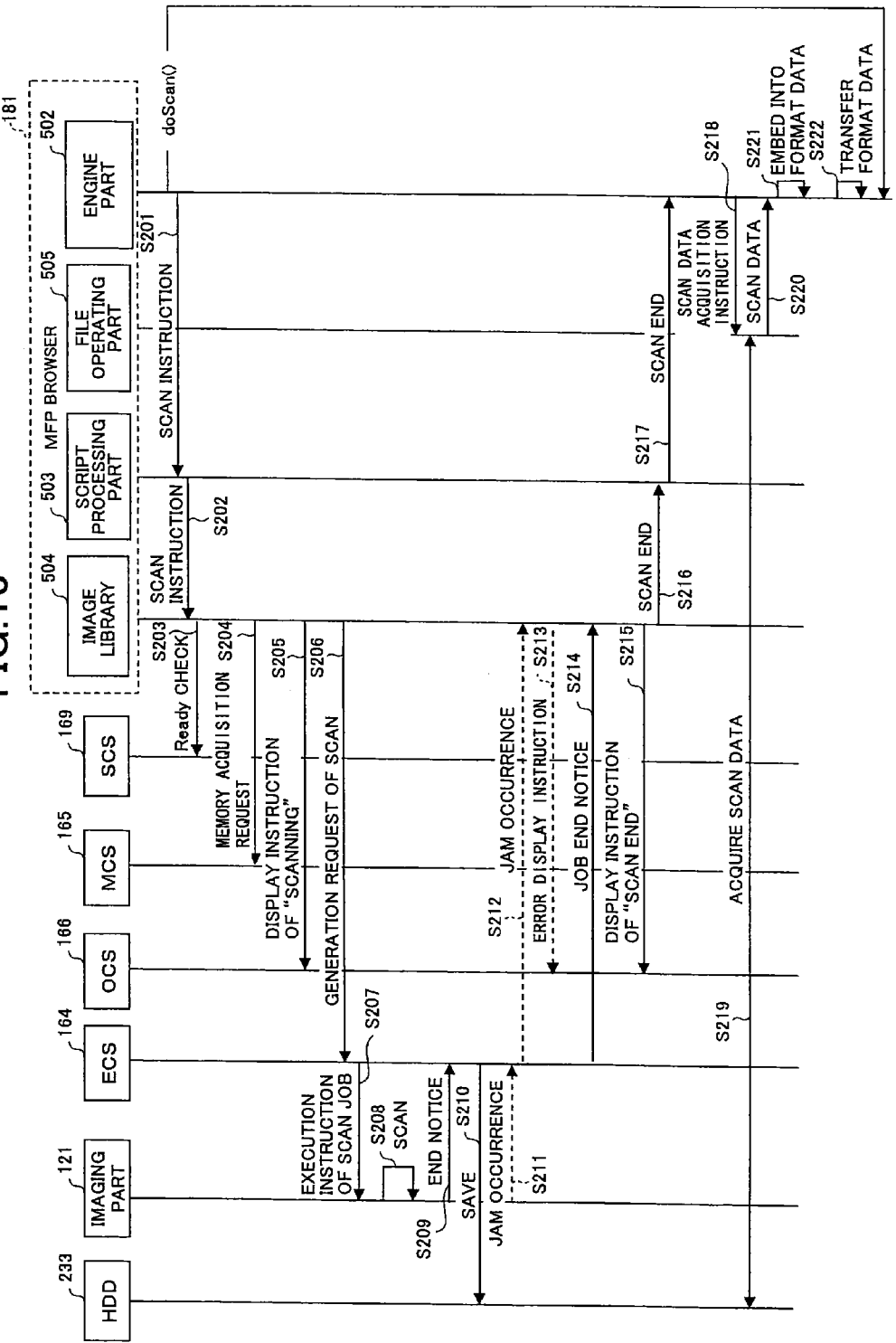

IMAGE HANDLING APPARATUS, IMAGE PROCESSING SYSTEM, IMAGE PROCESS CONTROLLING METHOD, AND IMAGE PROCESS CONTROLLING PROGRAM PRODUCT

CROSS REFERENCE TO RELATED APPLICATIONS

The present application is a Continuation application of U.S. Ser. No. 13/103,702, filed May 9, 2011, which is a Continuation of U.S. Ser. No. 11/436,698, filed May 19, 2006, now U.S. Pat. No. 7,957,021 issued on Jun. 7, 2011 and is based on and claims priority to Japanese Patent Application No. 2005-148830, filed May 20, 2005, the entire contents of each of which are incorporated herein by reference in their entirety.

BACKGROUND OF THE INVENTION

1. Field of the Invention

The present invention generally relates to an image handling apparatus, an image processing system, an image process controlling method, and an image process controlling program product, and more particularly to the image handling apparatus including an operation panel and at least one of an imaging part and a printing part, the image processing system including the image handling apparatus, the image process controlling method, and the image process controlling program product.

2. Description of the Related Art

Recently, an image forming apparatus, such as a multi-functional apparatus which realizes various functions of a printer, a copier, a scanner, and a facsimile in a single chassis, includes a CPU (Central Processing Unit) similar to a general computer although a memory and a like are strictly limited. Each of the various functions is controlled by an application.

In some of such image forming apparatuses, an API (Application Program Interface) is opened to implement applications, and it is possible to customize by implementing appropriate application for a usage environment of a user after shipping (for example, Japanese Laid-open Patent Application No. 2005-269619).

Moreover, in the image forming apparatus displays a screen at an operation panel by using HTML (Hyper Text Markup Language) data (for example, Japanese Laid-open Patent Applications No. 2000-125073 and No. 2002-152458).

However, in order to implement a new application based on the API which is opened, it is required to be acquainted with the C language, the Java™ language, and the like, and it is not easy to master these programming languages. In addition, the image forming apparatus is required to provide an execution environment for a new application development and to be developed.

Also, in a case of displaying the HTML data at the operation panel of the image forming apparatus by an application of an external server, it is effective to develop a screen since the application can be developed and managed at a server side. However, since the HTML data are basically used to display data, only displaying the HTML data at the operation panel can not realize to control special hardware used to generate an image.

SUMMARY OF THE INVENTION

Embodiments of the present invention solve or reduce one or more of the above problems.

In order to solve or reduce one or more of the above problems, as one of embodiments, an image handling apparatus may include an operation panel displaying an input screen allowing to input image handle information for handling an image based on display control information received from an external apparatus capable of connecting through a network, and receiving an instruction of an image generation; hardware resources for generating an image; a transferring part transferring the image handle information input at the input screen to the external apparatus; and an image generation controlling part receiving and parsing image generation information for at least one of the hardware resources to execute an image generation based on the image handle information, from the external apparatus in response to an instruction of the image generation, so that at least one of the hardware resources executes the image generation.

In the image handling apparatus, it is possible to provide an interface capable of controlling special hardware mounted in the image forming apparatus.

BRIEF DESCRIPTION OF THE DRAWINGS

In the following, embodiments of the present invention will be described with reference to the accompanying drawings.

FIG. 11 is a diagram showing a definition example of the script in the scan execution instruction data according to the embodiment of the present invention;

FIG. 13 is a sequence diagram for explaining a process procedure in doScan ( ) according to the embodiment of the present invention.

DESCRIPTION OF THE PREFERRED EMBODIMENT

Figure 1:
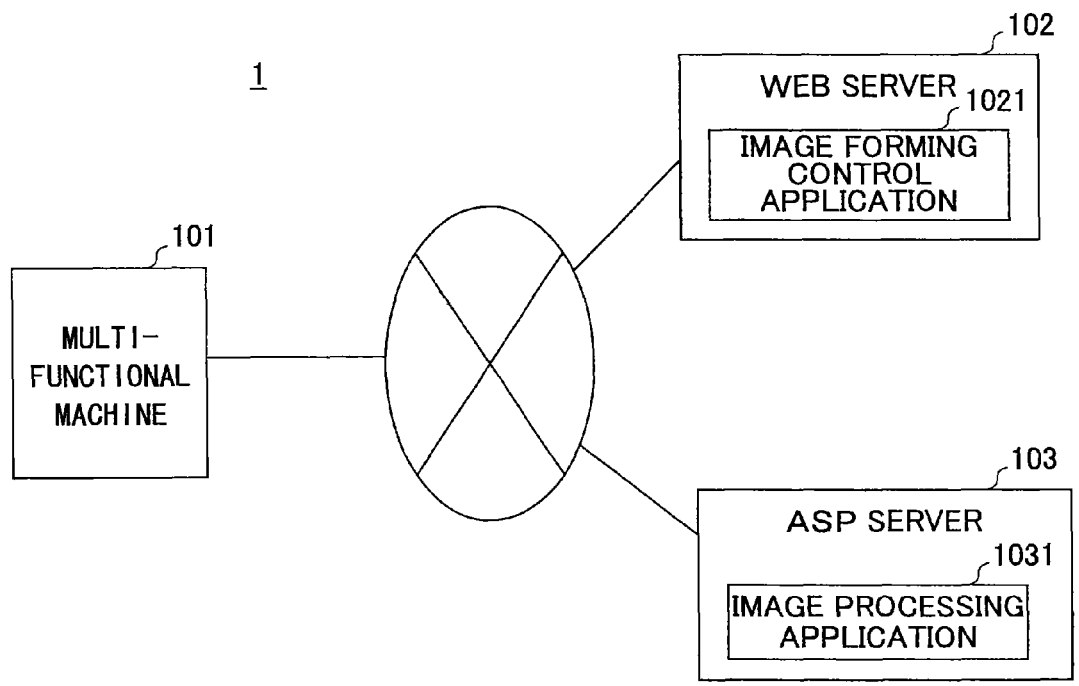
FIG. 1 is a diagram showing a configuration of an image processing system according to an embodiment of the present invention.

In the following, an embodiment of the present invention will be described with reference to the accompanying drawings. FIG. 1 is a diagram showing a configuration of an image processing system according to the embodiment of the present invention. In FIG. 1, the image processing system 1 includes a multi-functional machine 101, a Web server 102, an ASP (Application Service Provider) server 103, and a like, each of which is connected to a network (any of a wired or wireless network) such as a LAN (Local Area Network), the Internet, and a like.

The multi-functional machine 101 is an image forming apparatus which realizes various functions such as a copier, a scanner, a printer, and a like in a single chassis, and is one example of an image handling apparatus. The multi-functional machine 101 includes an operation panel and an MFP (Multi-Function Peripheral) browser as a Web browser for displaying an operation screen at the operation panel based on HTML (HyperText Markup Language) data.

The Web server 102 is a general computer implementing a function as a Web server such as an httpd (hypertext transfer protocol daemon) and a like. The Web server 102 includes an image forming control application 1021 as a Web application. In response to an HTTP request from the MFP browser in the multi-functional machine 101, the image forming control application 1021 generates an HTML data used for an operation screen which is to be displayed at the operation panel of the multi-functional machine 101, and sends the HTML data to the MFP browser.

The ASP server 103 is a general computer implementing an image processing application as an application for providing various services concerning image data formed in the multi-functional machine 101. For example, the image processing application 1031 accumulates image data which is scanned by the multi-functional machine 101 and transferred to the ASP server 103, and delivers the image data to an indicated destination.

Figure 2:
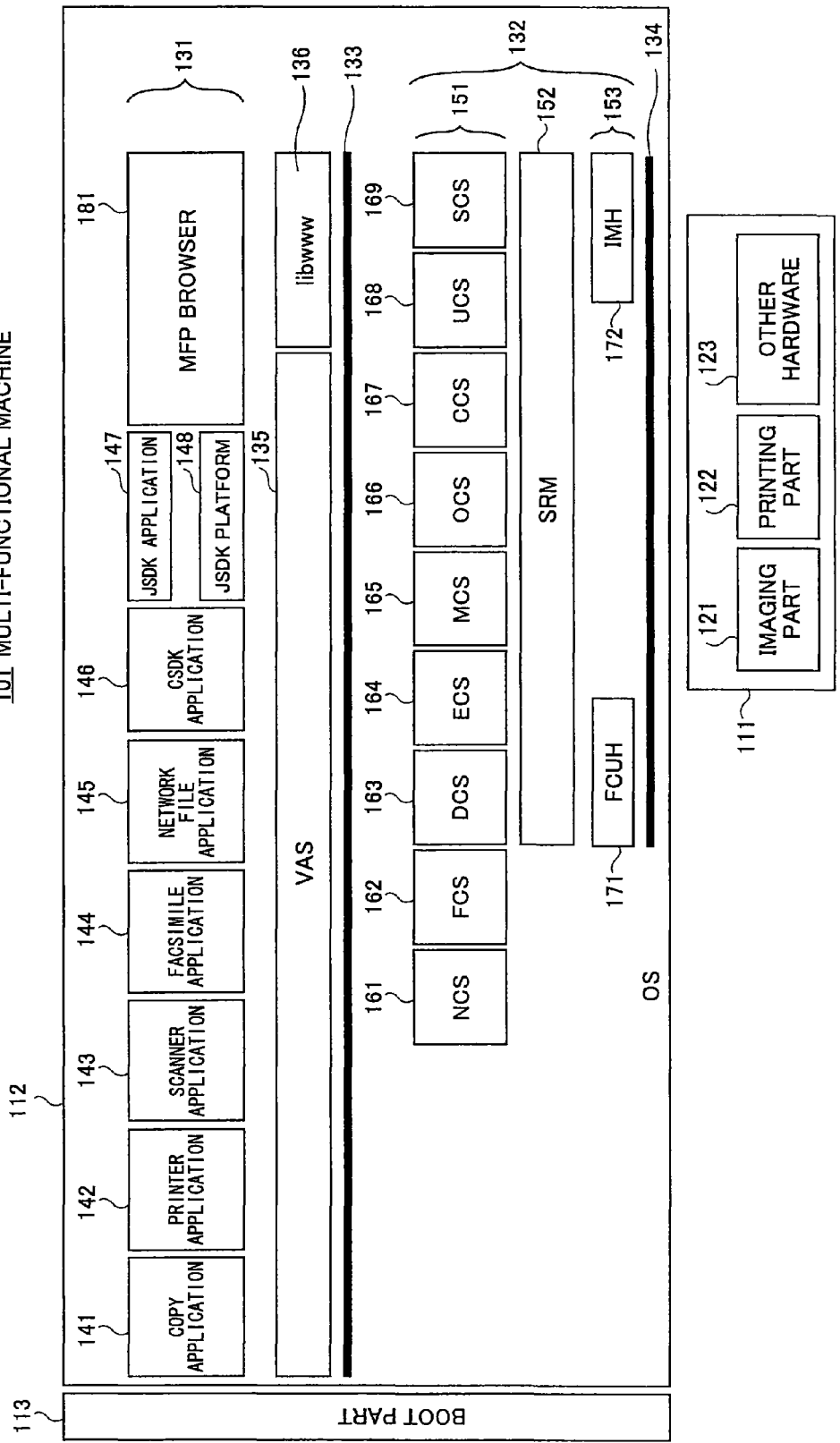
FIG. 2 is a block diagram showing a software configuration of a multi-functional machine according to the embodiment of the present invention.

FIG. 2 is a block diagram showing a software configuration of the multi-functional machine according to the embodiment of the present invention. In FIG. 2, the multi-functional machine 101 includes hardware resources 111, a software group 112, and a boot part 113.

The hardware resources 111 of the multi-functional machine 101 includes an imaging part 121, a printing part 122, and other hardware 123. The imaging part 121 is hardware to scan an image (image data) from an original sheet. The printing part 122 is hardware to print the image (image data) on a printing sheet.

The software group 112 of the multi-functional machine 101 includes various applications 131, and various platforms 132, which are programs. These programs are executed in parallel by a process unit on an OS (Operating System) such as UNIX™ and the like.

The application group 131 includes a copy application 141 which is an application for a copy, a printer application 142 which is an application for a printer, a scanner application 143 which is an application for a scanner, a facsimile application 144 which is an application for a facsimile, a network application 145 which is an application for a network file, an MFP browser 181, and a like.

The MFP browser 181 corresponds to the above-described MFP browser. The MFP browser 181 obtains HTML data from the Web server 102 shown in FIG. 1 through a libwww 136 which is a library for realizing a client function in an HTTP communication, and displays the HTML data at an operation panel. Moreover, the MFP browser 181 comprehends scripts (program written in a script language) described in the HTML data, and controls the hardware resources 111 of the multi-functional machine 101. That is, the MFP browser 181 can comprehend not only the script which a general Web browser can process, but also a script (for example, an execution instruction of a scan and a like) which is enhanced to control the hardware resources 111 of the multi-functional machine 101. Thus, it is possible to made the multi-functional machine 101 execute an image process.

It should be noted that the application 131 can be developed by using a special SDK (Software Development Kit). The application 131 developed by using the SDK is called a SDK application. As the special SDK, "CSDK" for developing the application 131 by the C language, and "JSDK" for developing the application 131 by the Java™ language are provided. The application 131 developed by using the CSDK is called a "CSDK application". In the multi-functional machine 101 shown in FIG. 2, a CSDK application 146 and a JSDK application 147 are included. Moreover, in the multi-functional machine 101, a JSDK platform 148 is included as software 112 for intermediating between the JSDK application 147 written in the Java language and other software 112 written in the C language.

In the embodiment, the MFP browser 181 is an application implemented as the CSDK application.

The platforms 132 includes various control services 151, a system resource manager 152, and various handlers 153. The control service 151 includes a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handler 153 includes a facsimile control unit handler (FCUH) 171, and an image memory handler (IMH) 172.

A process of the NCS 161 intermediates a network communication. A process of the FCS 162 provides an API of a facsimile. A process of the DCS 163 conducts a control concerning a delivery process of documents being accumulated. A process of the ECS 164 conducts a control concerning the imaging part 121 and the printing part 122. A process of the MCS 165 conducts a control concerning a memory and a hard disk drive. A process of the OCS 166 conducts a display control and a like concerning the operation panel. A process of the CCS 167 conducts a control concerning an authentication process and a charging process. A process of the UCS 168 conducts a control concerning a management of user information. A process of the SCS 169 conducts a control concerning a management of a system.

The software 112 for intermediating between the applications 131 and the platforms 132 includes a virtual application service (VAS) 135. The VAS 135 acts as a server process for applications 131 as a client, and also acts as a client process for the platforms 132 as a server. The VAS 135 includes a wrapping function for camouflaging the platforms 132 in a view from the applications 131, and assimilates a version difference due to a version up of the platforms 132.

First, the boot part 113 is activated when the multi-functional machine 101 is turned on. After the boot part 113 is activated, the OS such as UNIX™ or a like is activated, and the applications 131 and the platforms 132 are activated. These programs are stored in the hard disk drive and a memory card, are reproduced from the hard disk drive and the memory card, and resides in a memory.

Figure 3:
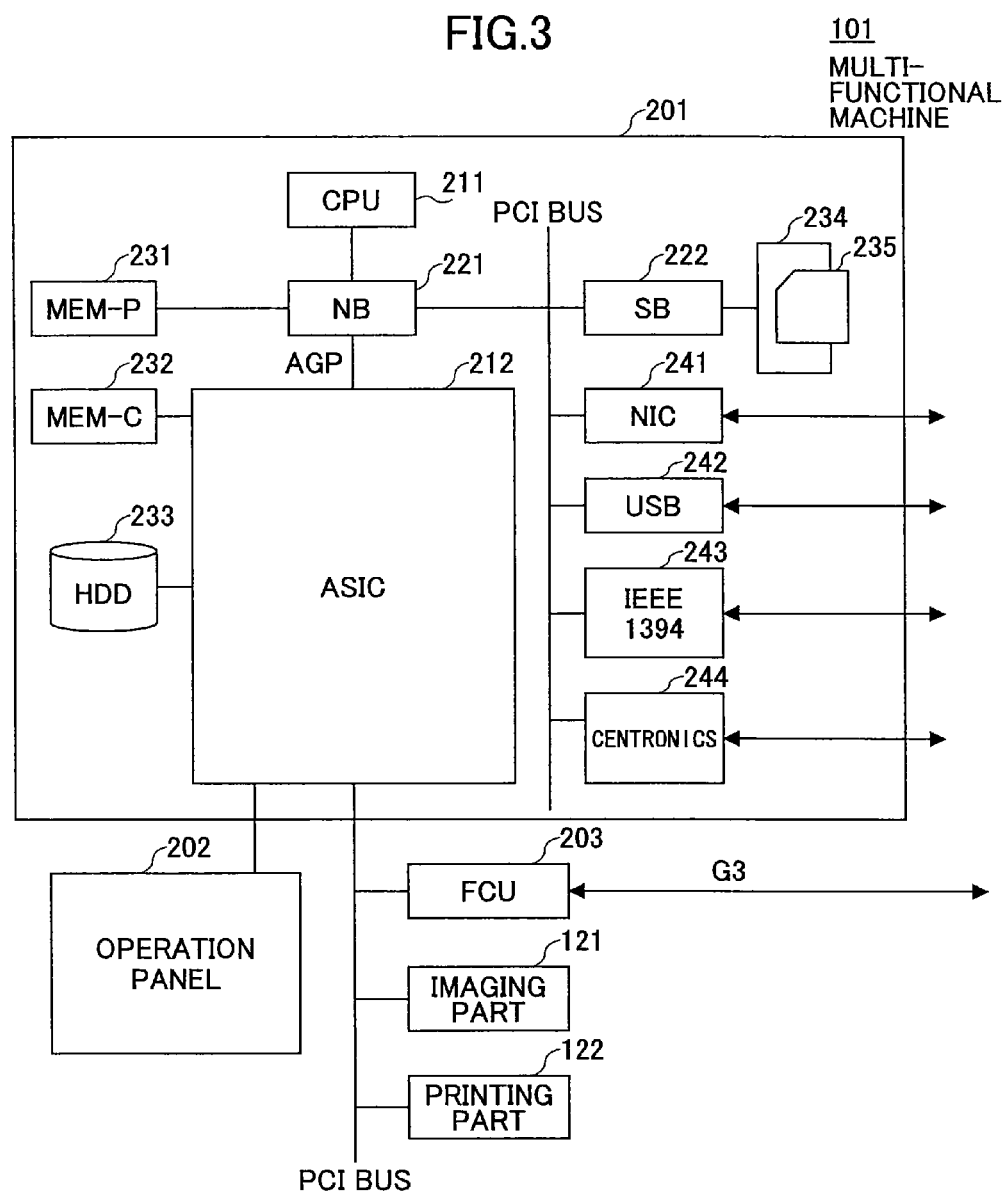
FIG. 3 is a diagram showing a hardware configuration of the multi-functional machine according to the embodiment of the present invention.

FIG. 3 is a diagram showing a hardware configuration of the multi-functional machine according to the embodiment of the present invention. The hardware resources 111 of the multi-functional machine 101 include a controller 201, an operation panel 202, a facsimile control unit (FCU) 203, the imaging part 121, and the printing part.

The controller 201 includes a CPU 211, an ASIC (Application Specific Integrated Circuit) 212, an NB (North Bridge) 221, an SB (South Bridge) 222, an MEM-P 231, an MEM-C 232, an HDD (Hard Disk Drive) 233, a memory card slot 234, an NIC (Network Interface Controller) 241, a USB (Universal Serial Bus) device 242, an IEEE 1394 device 243, and a Centronics device 244.

The CPU 211 is an IC (Integrated Circuit) for various information processes. The ASIC 212 is an IC for various image processes. The NB 221 is a north bridge of the controller 201. The SB 222 is a south bridge of the controller 201. The MEM-P 231 is a system memory of the multi-functional machine 101. The MEM-C 232 is a local memory of the multi-functional machine 101. The HDD 233 is storage of the multi-functional machine 101. The memory card slot 234 is a slot to set a memory card 235. The NIC 241 is a controller for a network communication by a MAC (Media Access Control) address. The USB device 242 is a connection terminal of a USB standard. The IEEE 1394 device 243 is a connection terminal of an IEEE 1394 standard. The centronics device 244 is a connection terminal in accordance with a centronics specification. The operation panel 202 is hardware (operating part) for an operator to input data to the multi-functional machine 101, and also is hardware (displaying part) for an operator to obtain an output from the multi-functional machine 101.

Each of the applications 131 such as the MFP browser 181 and the like is recorded in the memory card 235, the HDD 233, or the like, and realizes its function by being processed by the CPU 211.

Figure 4:
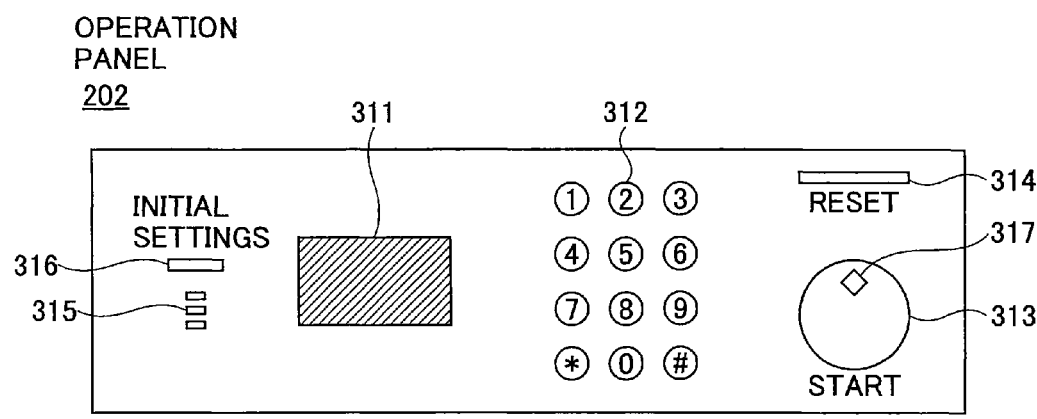
FIG. 4 is a diagram showing an example of an operation panel of the multi-functional machine according to the embodiment of the present invention.

FIG. 4 is a diagram showing an example of an operation panel of the multi-functional machine according to the embodiment of the present invention. In FIG. 4, the operation panel 202 includes a touch panel 311, a ten key 312, a start button 313, a reset button 314, function keys 315, and an initial setting button 316. The touch panel 311 is hardware (touch operating part) to input data by a touch operation, and also is hardware (screen displaying part) to obtain an output at a screen display. The ten key 312 is hardware to input numbers by a key (button) operation. The start button 313 is hardware for a start operation by a button operation. An LED (Light Emitting Diode) lump 317 is provided to the start button 313. The LED lump 317 is a lump for informing validity of execution start of an application selected by the function keys 315. The LED lump 317 is turned to be red if conditions to start the application are not met, and the LED lump 317 is turned to be green if the conditions are met. Accordingly, a user recognizes that the user can press the start button to start the application when the LED lump 317 is lighted. The reset button 314 is hardware for a reset operation by the button operation. Applications (for example, the copy application 141, the printer application 142, and the scanner application 143) are assigned to the function keys 315. However, when any one of the function keys 315 is pressed, an initial screen of an application being assigned to the one of the function keys 315 is displayed at a touch panel 311. The initial setting button 316 is hardware to display the initial setting screen by the button operation.

Figure 5:
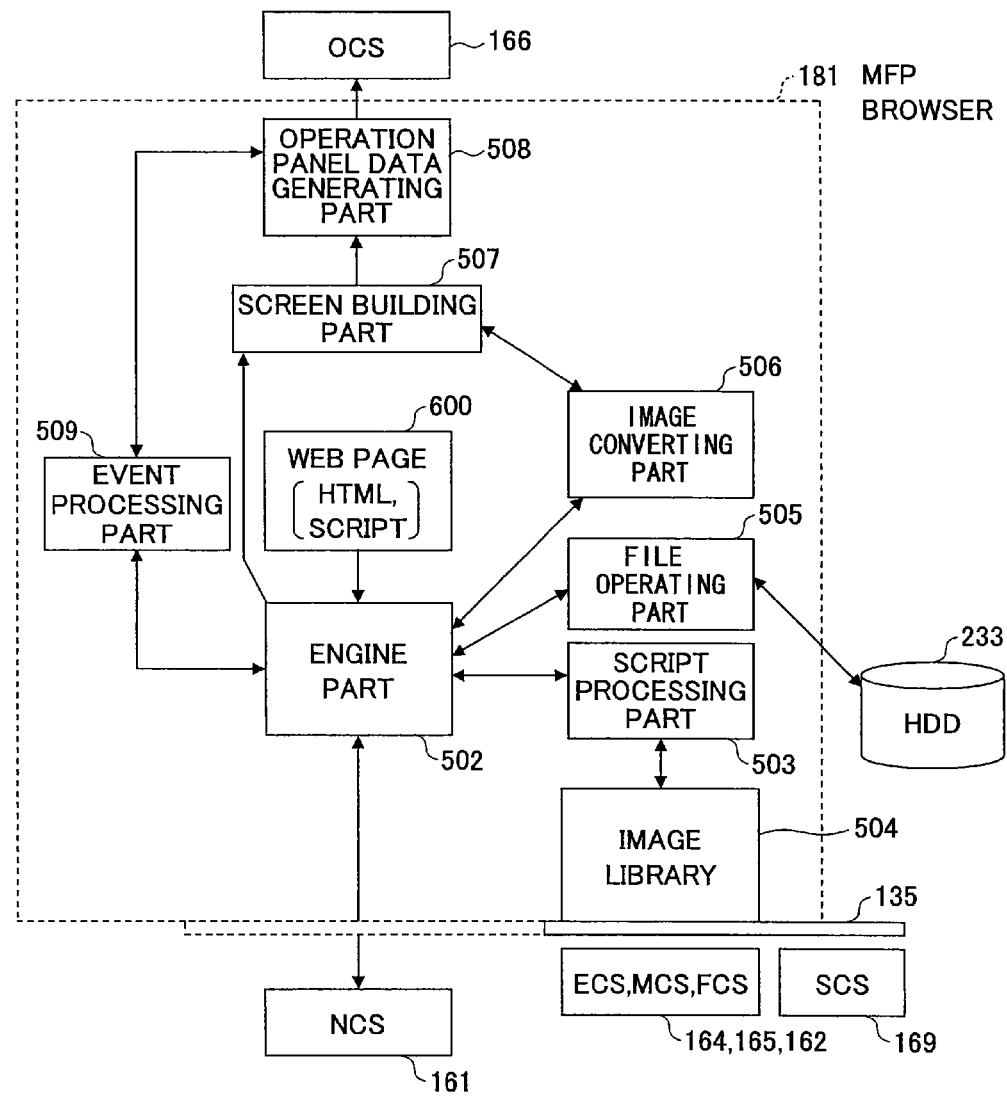
FIG. 5 is a diagram showing a functional configuration of an MFP browser according to the embodiment of the present invention.

Next, the MFP browser 181 will be described in detail. FIG. 5 is a diagram showing a functional configuration of the MFP browser according to the embodiment of the present invention. In FIG. 5, the MFP browser 181 includes an engine part 502, a script processing part 503, an image library 504, a file operating part 505, an image converting part 506, a screen building part 507, an operation panel data generating part 508, an event processing part 509, and a like. It should be noted that HTML data 600 is HTML data transferred from the Web server 102.

The engine part 502 is a main part of the MFP browser 181. The engine part 502 parses an HTML and Java™ Script (hereinafter, simply called "script") in the HTML data 600, instructs the screen building part 507 to build an operation screen defined by the HTML, and instructs the script processing part 503 or the file operating part 505 to execute a process defined in scripts.

The script processing part 503 executes a process concerning an image process in processes defined in the scripts in the HTML data 600. The image library 504 is a library which provides a function interface for an application unit such as a copy, a scan, or a print. For example, the script processing part 503 realizes a function such as the copy, the scan, or the print by calling the image library 504.

The file operating part 505 conducts a file operation which occurs when the scripts are executed or is needed for a cache of the HTML data 600.

The image converting part 506 converts the image data into a displayable format when the HTML data 600 includes image data.

The screen building part 507 generates layout information of the operation screen after the engine part 502 parses the HTML.

The operation panel data generating part 508 converts the layout information generated by the screen building part 507, into a data format or a control instruction which the OCS 166 can comprehend, and outputs information as the data format or the control instruction to the OCS 166 after the layout information is converted. The OCS 166 displays the operation screen at the touch panel 311 of the operation panel 202 based on the information provided from the operation panel data generating part 508. That is, since the layout information generated by the screen building part 507 is based on a general format, the operation panel data generating part 508 converts the layout information so as to be suitable for the touch panel 311 of the operation panel 202 of the multi-functional machine 101.

The event processing part 509 detects events occurred by inputs with respect to the HTML data or the like displayed at the touch panel 311 and operations with respect to other buttons (the start button 313 and the like) on the operation panel 202, and informs occurrences of the events to the engine part 502 and the like.

In the following, a scan process will be described as one example of processes conducted by the image processing system 1. The scan process includes various processes from a start of scanning an original sheet to a deliver of image data generated by scanning the original sheet.

Figure 6:
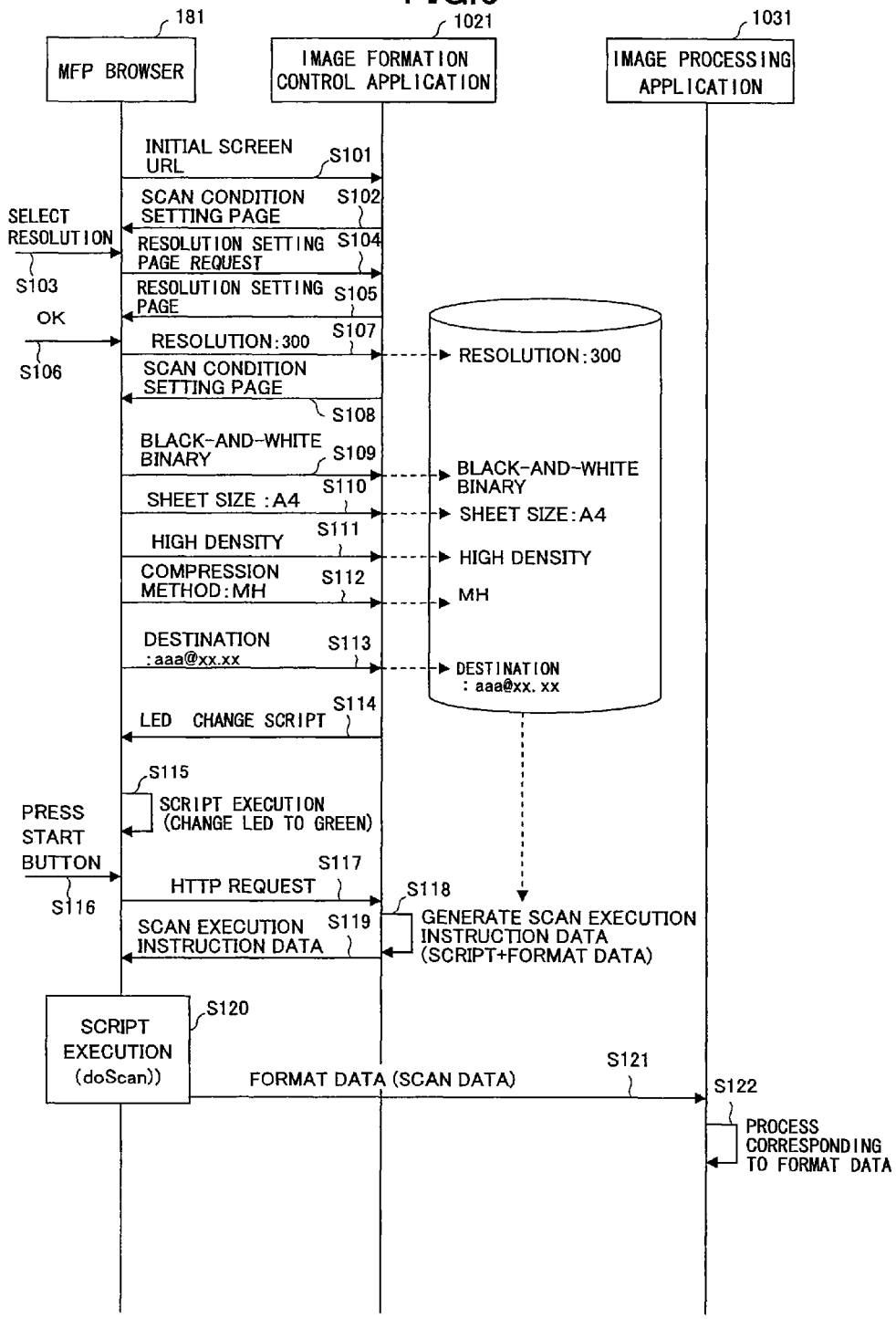
FIG. 6 is a sequence diagram for explaining a process procedure of a scan process according to the embodiment of the present invention.

FIG. 6 is a sequence diagram for explaining a process procedure of the scan process according to the embodiment of the present invention.

When the multi-functional machine 101 is turned on and activated and the MFP browser 181 is activated, the engine part 502 of the MFP browser 181 sends an HTTP request concerning an URL of the initial screen, which is defined beforehand, to the Web server 102 through the libwww 136 (S101).

The image forming control application 102 of the Web server 102 replies to the MFP browser 181 with HTML data corresponding to the URL indicated in the HTTP request (S102). In general, the initial screen may be a login screen or a screen for selecting an application. In this case, as an example, the HTML data for displaying a scan condition setting screen (hereinafter, called "scan condition setting page") are sent back to the MFP browser 181. Accordingly, the MFP browser 181 parses a definition in the HTML for the scan condition setting page, and displays the scan condition setting screen at the touch panel 311.

Figure 7:
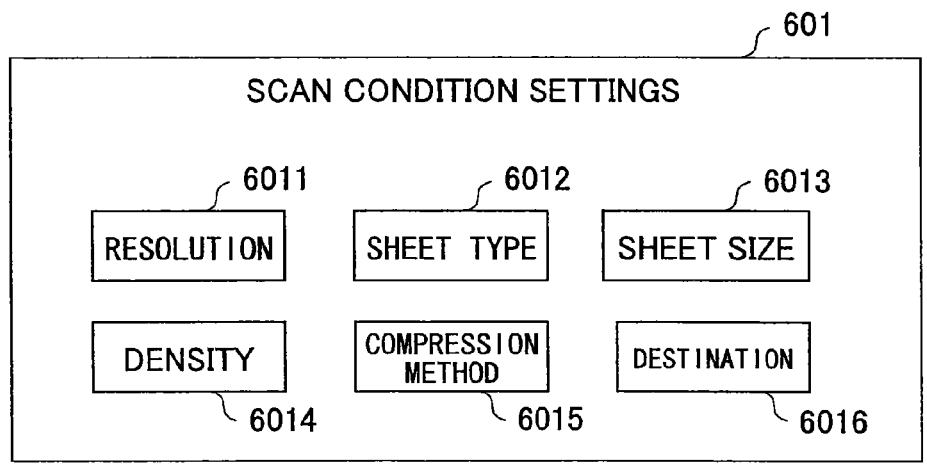
FIG. 7 is a diagram showing a display example of a scan condition setting screen according to the embodiment of the present invention.

FIG. 7 is a diagram showing a display example of the scan condition setting screen according to the embodiment of the present invention. In FIG. 7, the scan condition setting screen 601 displays a resolution button 6011, a sheet type button 6012, a sheet size button 6013, a density button 6014, a compression method button 6015, a destination button 6016, and a like, each of which is a button for displaying a screen to set a condition. In detail, in the scan condition setting page, each of buttons 6011 through 6016 is associated with a URL as a link of the HTML data for setting a condition corresponding to the button.

For example, when the resolution button 6011 is pressed (touched) (S103), the MFP browser 1021 sends an HTTP request indicating an URL linked to the resolution button 6011, to the Web server 102 (S104). The image forming control application 1021 generates HTML data for displaying a resolution setting screen (hereinafter, called "resolution setting page") based on the URL, and replies to the MFP browser 181 with the resolution setting page (S105). The MFP browser 181 parses a definition of the resolution setting page, and displays the resolution setting screen at the touch panel 311.

Figure 8:
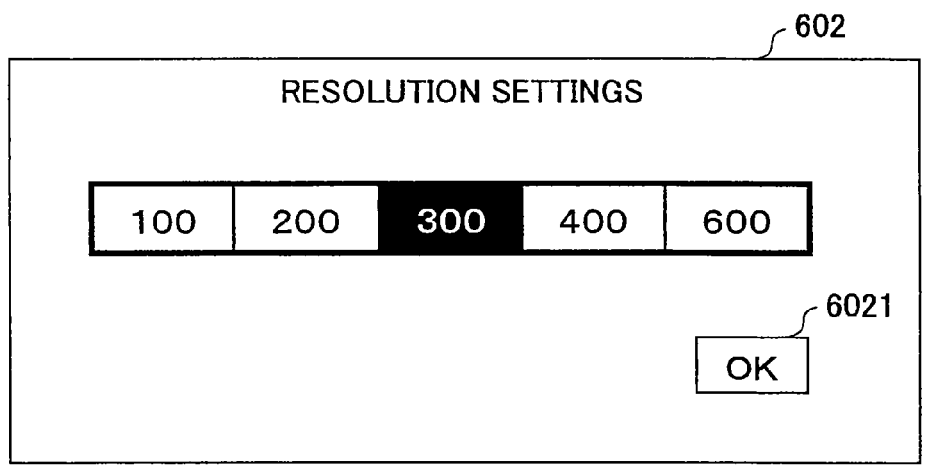
FIG. 8 is a diagram showing a display example of a resolution setting screen according to the embodiment of the present invention.

FIG. 8 is a diagram showing a display example of the resolution setting screen according to the embodiment of the present invention. As shown in FIG. 8, the resolution setting screen 602 displays a button for each resolution. The resolution setting page defines an operation when the OK button 6021 is pressed. Accordingly, when one of resolutions is selected at the resolution setting screen 602 and the OK button 6021 is pressed (S106), the MFP browser 181 sends a POST message informing the resolution selected by the user based on the definition in the resolution setting page, to the Web server 102 (S107).

When the POST message is received, the image forming control application 1021 stores and maintains information indicating the resolution included in the POST message in a memory of the Web server 102, and replies to the MFP browser 181 with the scan condition setting page (S108). Accordingly, the display screen at the touch panel 311 goes back to the scan condition setting screen 601 (FIG. 7), again.

In the following, the user operates the scan condition setting screen 601 to display setting screens for other conditions in the same manner as a case of setting the resolution. Data exchanges between the MFP browser 181 and the Web server 102 are conducted similar to the case of setting the resolution. By conducting several setting operations, for example, the sheet type (black-and-white binary), the sheet size (A4), the density (high density), the compression method (MF), the destination (electronic mail address of a receiver), and the like are posted to the Web server 102. The sheet type (black-and-white binary), the sheet size (A4), the density (high density), the compression method (MF), the destination (electronic mail address of a receiver), and the like are maintained in the memory by the image forming control application 1021 (S109, S110, S112, and S113). That is, in this embodiment, the scan condition is not stored in the multi-functional machine 101 but is stored and maintained in the Web server 102. The multi-functional machine 101 simply executes a process in accordance with the HTML data sent from the Web server 102. Thus, the multi-functional machine 101 has no concern with meanings of information to be displayed by the HTML data. As described above, the multi-functional machine 101 can be simply implemented. For a embedded device having a strict limitation of a memory capacity, this implementation method is a significantly effective.

The image forming control application 1021 comprehends a button pressed and the scan condition selected by the user by using the information posted from the multi-functional machine 101 (MFP browser 181) if necessary. Thus, in response to a value selected for a certain condition, the image forming control application 1021 can dynamically change contents of the setting screens for other conditions. For example, in a case in that color is selected as the sheet type, a compression method for binary data such as MH (Modified Huffman) or MMR (Modified MR) does not have meanings. Accordingly, in this case, the image control application 1021 generates a compression method selecting page to make selections of MH and MMR to be gray displays.

Moreover, it is possible to provide the HTML data to display the setting screen suitable for a performance of the multi-functional machine 101.

When the image forming control application 1021 determines in response to the scan condition successively sent from the MFP browser 181 that least necessary information to be set for a scan execution is collected, the image forming control application 1021 sends HTML data including control information allowing the user to press the start button 313 of the operation panel 202 of the multi-functional machine 101 to the MFP browser 181 (S114). In detail, the HTML data includes a definition of the script for changing a color of the LED lump 317 of the operation panel 202 from red to green.

Figures 9, 10:
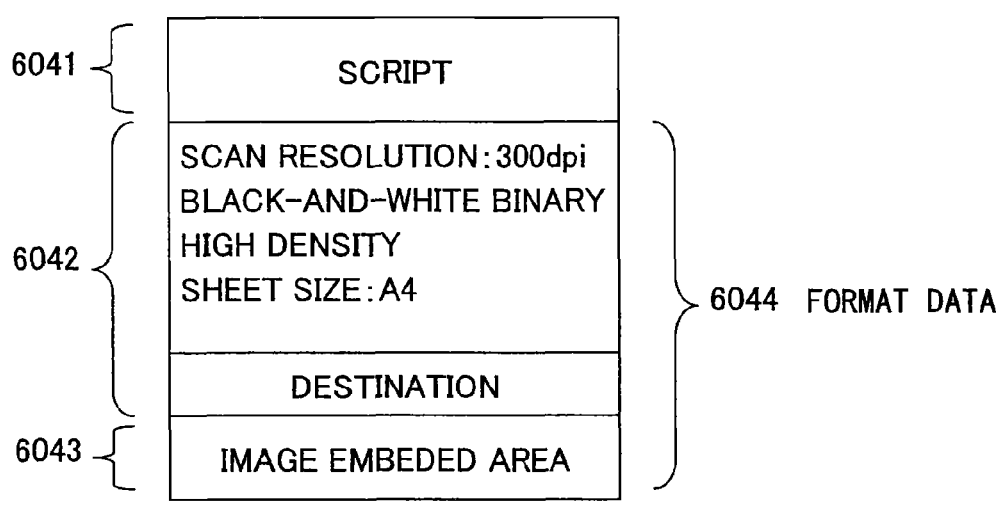
FIG. 9 is a diagram showing a definition example of a script for changing a color of an LED lump according to the embodiment of the present invention.
FIG. 10 is a diagram showing a conceptual configuration example of scan execution instruction data according to the embodiment of the present invention.

FIG. 9 is a diagram showing a definition example of the script for changing the color of the LED lump according to the embodiment of the present invention. In script 603 shown in FIG. 9, "System.LocalCGI.Setting.StartKeyDisable=1" is an instruction to change the color of the LED lump 317.

For example, in the HTML data including script 603, it is assumed that the script 603 is executed when the HTML data are loaded to the MFP browser 181 (occurrence of onLoad event). In this case, the engine part 502 of the MFP browser 181 parses the script 603 and outputs a change instruction of the color of the LED lump 317 to the OCS 166 (S115). The OCS 166 changes the color of the LED lump 317 to green.

It can be implemented so that the user is allowed to press the start button 313 (the LED lump 317 is changed from red to green) for a certain usage environment of the user even if no setting is made at the scan condition setting screen after the login. In the embodiment, a case is described in that a scan can not be started until each condition is set and a destination is set.

When the LED lump 317 turns to green, the user recognizes that the user can start a scan operation, and presses the start button 313 (S116). A press event of the start button 313 is informed to the MFP browser 181. In response to the press event, the MFP browser 181 sends the HTTP request which requests data (hereinafter, called "scan execution instruction data") defining contents of a scan execution instruction (S117). The image forming control application 1021 generates the scan execution instruction data (S118), and sends the scan execution instruction data to the MFP browser 181 (S119).

The scan execution instruction data will be described. FIG. 10 is a diagram showing a conceptual configuration example of the scan execution instruction data according to the embodiment of the present invention. In FIG. 10, the scan execution instruction data 604 are data of the HTML format similar to other HTML data, and includes a script 6041, setting information 6042, an image embedded area 6043, and a like.

The script 6041 defines the contents of the scan execution instruction. The setting information 6042 is used to handle image data obtained by a scan, and is a set of values of the scan conditions set through the scan condition setting screen in detail. For example, each condition is distinguished by a tag and a value is described. The image embedded area 6043 is an area to relate information (setting information 6042) for handling the image data to the image data. For example, the image data may be embedded in the image embedded area 6043. A pointer (location information) of the image data is set and the image data is stored as another file. In this case, a relationship for a correspondence between the pointer and the image data may be managed in a format such as a table which is indicated by the URL (described later). In this embodiment, a case of embedding the image data in the image embedded area 6043 will be described as one example. At this point, since there is no image data, a start tag and an end tag indicating the image embedded area 6043 are simply written.

FIG. 11 is a diagram showing a definition example of the script in the scan execution instruction data according to the embodiment of the present invention. In a script 6041 shown in FIG. 11, a description 6041b ("System.LocalCGI.doScan (<URL>, "Post")") is a scan execution function (hereinafter, called "doScan ( )"), and the doScan ( ) is defined and implemented in the engine part 502 or the like. In the doScan ( ), a scan execution process and a deliver process of the scan image are defined. On the other hand, a description 6041a is a definition so that the scan condition indicated by the user can be referred in doScan ( ). In FIG. 11, only settings concerning the resolution are described and other settings are omitted.

In the scan execution instruction data 604, format data 6044 is a part formed by the setting information 6042 and the image embedded area 6043. The format data 6044 will be described later.

For example, it is assumed that it is defined in that the script 6041 is executed when the scan execution instruction data 604 is loaded to the MFP browser (at occurrence of onLoad event). In this case, the engine part 502 of the MFP browser 181 calls doScan ( ) by parsing the script 6041, and executes the process defined in doScan ( ). That is, by calling doScan ( ), the multi-functional machine 101 executes a scan, and image data obtained by the scan is transferred to an URL (for example, the image processing application 1031 of the ASP server 103) indicated as an argument of doScan ( ) (S120 and S121). The URL indicated by the argument of doScan ( ) may be determined in the Web server 102. Alternatively, a destination is set as a part of the scan condition can be used as the URL.

When the image data is transferred, the format data 6044 is used. That is, the MFP browser 181 extracts the format data 6044 from the scan execution instruction data 604, and attaches (embeds) the image data obtained by the scan between a start tag and an end tag within the image embedded area 6043. Then, the MFP browser 181 transfers the format data 6044 embedding the image data to the image processing application 1031.

Figure 12:
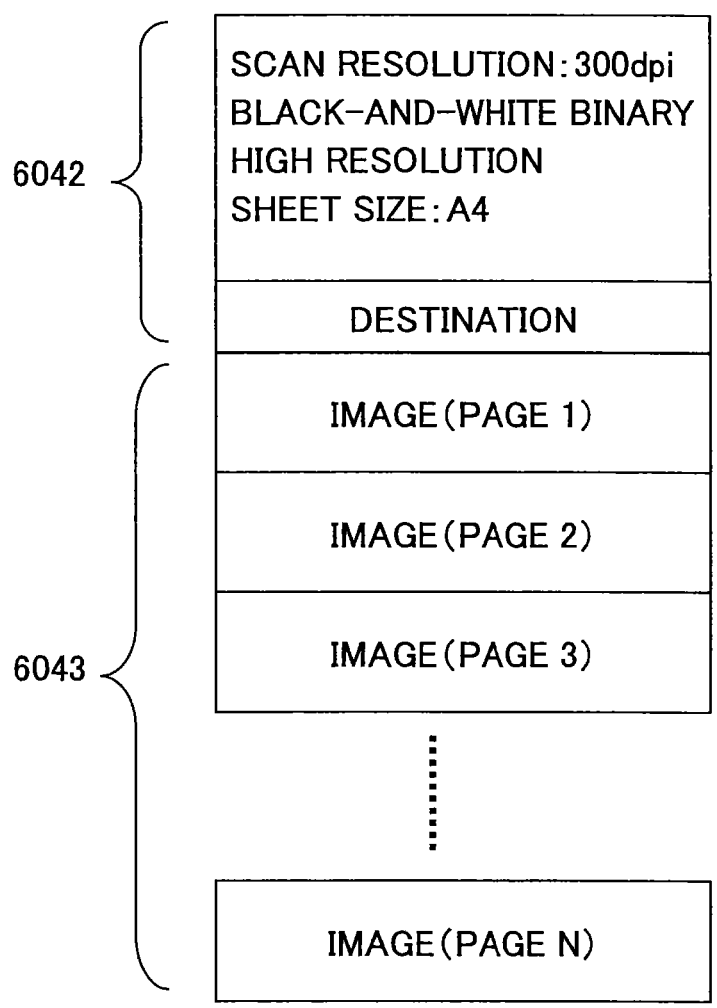
FIG. 12 is a diagram showing an example of format data embedding the image data according to the embodiment of the present invention.

FIG. 12 is a diagram showing an example of the format data embedding the image data according to the embodiment of the present invention. In FIG. 12, parts that are the same as those shown in FIG. 10 are given the same reference numbers.

In FIG. 12, the image data is embedded in the format data 6044 for each page of original sheets. In the step S121, the format data 6044 being formed as described above is transferred to the image processing application 1031.

When the image processing apparatus 1031 receives the format data 6044, the image processing apparatus 1031 executes a process corresponding to the format data 6044. For example, the image data is delivered to a destination indicated in the format data 6044. The format data 6044 also includes the image data and the scan condition. Accordingly, the image processing application 1031 can obtain the scan condition of the image data, and can deliver the image data after a further image process (for example, a conversion of the resolution or a like) is conducted based on the scan condition.

There are various formats required as transmission information of the image data depending on servers (the ASP server 103 in the embodiment of the present invention). One format requires transferring meta information in accordance with an XML (eXtensible Markup Language) format, and another format requires transferring information in accordance with an MIME (Multipurpose Internet Mail Extension) format. The format data 6044 provides a mechanism corresponding to a format condition in general. That is, the format data 6044 is generated corresponding to a server being the destination beforehand, and stores the format data 6044 in the Web server 102. Accordingly, the multi-functional machine 101 simply embeds the image data into the format data 6044 downloaded from the Web server 102 and transfers the format data 6044, without concerning a format possible for the destination to process and a usage at the destination.

FIG. 12 shows a case of transferring the image data for a plurality of pages at once. Alternatively, for example, in a case of changing the scan condition for each sheet, processes following the step S102 maybe repeated for each sheet.

Next, the process conducted by doScan ( ) will be described in detail. FIG. 13 is a sequence diagram for explaining a process procedure in doScan ( ) according to the embodiment of the present invention.

When the engine part 502 detects a call of doScan ( ) in the script 6041 in the scan execution instruction data 604, the engine part 502 conducts the scan execution instruction by calling a function of the script processing part 503 (S201). As an argument of the function, the scan condition set in the description 6041a shown in FIG. 11 is indicated. The script processing part 503 conducts the scan execution instruction by calling a function of the image library 504 (S202). The scan condition is indicated in an argument of the function.

The image library 504 calls the SCS 169 and has the SCS 169 check a ready state (usable state or not) of the imaging part 121 which is a scanner engine (S203). When it is confirmed that the imaging part 121 can be usable, the image library 504 requests the MCS 165 to acquire a memory (page memory) necessary to start a scan (S204). When the page memory is acquired, the image library 504 calls the OCS 166 and has the OCS 166 display a message "Scanning" at the touch panel 311 (S205). That is, instead of being based on the HTML data obtained from the Web server 102, the message "Scanning" is displayed in accordance with a control instruction, which is occurred within the multi-functional machine 101 during a series of process steps for executing the scan. In the same manner, an error and a scan end are displayed. A error display and a scan end display will be described later.

Subsequently, the image library 504 requires the ECS 164 to generate and execute a scan job in accordance with the scan condition indicated by doScan ( ) (S206). The ECS 164 generates the scan job and outputs the control instruction for executing the scan job to the imaging part 121 (S207). In response to the control instruction from ECS 164, the imaging part 121 executes a scan of an original sheet (S208). The image data obtained by the scan are stored in the page memory acquired by the MCS 165. Every time one page is scanned, a scan end notice is sent to the ECS 164 (S209). The ECS 164 receives the scan end notice for each page, compressed the image data stored in the page memory, and stores compressed image data in the HDD 233 (S210).

In a case in that a jam (JAM) or a like occurs during the scan, an occurrence of the jam is informed to the ECS 164 (S211). Moreover, the occurrence of the jam is informed from the ECS 164 to the image library 504 (S212). In this case, the image library 504 makes the OCS 166 display the error at the touch panel 313 (S213). After the error is released, a popup display or a like for a stop or a restart of the scan is also controlled by the image library 504. The scan is stopped when the stop of the scan is instructed, and the scan is resumed when the restart of the scan is instructed.

When the ECS 164 receives the scan end for all pages, the ECS 164 informs a job end notice indicating that the scan completed, to the image library 504 (S214). The image library 504 calls the OCS 166 and has the OCS 155 display a message "Scan End" at the touch panel 311 (S215). Moreover, the image library 504 informs a scan end to the script processing part 503 (S216). The script processing part 503 informs the scan end to the engine part 502 (S217).

When the scan completed, the engine part 502 acquires the image data stored in the HDD 233 through the file operating part 505 (S218, S219, and S220). The image data acquired from the HDD 233 is embedded into the format data 6044 (S211). Subsequently, the engine part 502 transfers the format data 6044 embedding the image data to the URL indicated as the argument of doScan ( ) (S222).

As seen from the above, after the scan execution instruction data 604 is received, a communication with the Web server 102 is not conducted, displays to the touch panel 311 such as "Scanning", the error display, "Scan End", and the like are conducted based on a control in the multi-functional machine 101. In the scan process (or the print process), a page to be resumed after the error is released generally depends on a machine type, and also depends on a single side/double side sheet, a single side/double side print, a presence of a finisher, and a like. A process becomes complicate if the error display, the popup display of the stop or the restart, and the like are conducted based on the HTML data acquired by the Web server 102. Accordingly, it is effective to process these displays within the multi-functional machine 101. Since these processes depending on the machine type and the like are covered up by the multi-functional machine 101, logic, the HTML data, or the like provided from the Web server 102 can be applied in common in different machine types.

The HTTP request concerning the URL of the initial screen is sent not only when the MFP browser 181 is activated but also when a system auto-clear function and an application auto-clear function are activated. Since in the multi-functional machine 101, a plurality of applications are operated in parallel, there is the system auto-clear function in which if a user uses a specific application (for example, the scanner application 143) and leaves the specific application alone, the screen displayed at the touch panel 311 goes back to the initial screen (in general, for the copy application 141, and changeable) of an application, which is automatically and initially displayed at a certain time after power is turned on. In addition, it is concerned that the user may step away from the multi-functional machine 101 in a middle of using the application, and the application auto-clear function is implemented in which the screen displayed at the touch panel 311 automatically goes back to the initial screen of the application when a certain time lapses. Accordingly, in a short time after the scan execution, the MFP browser 181 downloads the scan condition setting page by the application auto-clear function or the system auto-clear function, and displays the scan condition setting screen at the touch panel 313. Moreover, when any one of the function keys 315 of the operation panel 202 is pressed, the MFP browser 181 starts to download the HTML data for displaying the initial screen of the application corresponding to a key being pressed.

In the above, the ASP server 103 is the destination to transfer the format data 6044 to which the image data are attached. Alternatively, the destination can be a personal computer (PC) of a user or the Web server 102. In a case in that the destination is the Web server 102, it is convenient to transfer the format data 6044 in a session established between the MFP browser 181 and the Web server 102. However, since the scan process requires a certain time and the display at the touch panel 313 during the scan execution is controlled in the multi-functional machine 101 as described above, the communication with the Web server 102 is not always needed. Accordingly, it is concerned that the session between the image forming control application 1021 of the Web server 102 and the MFP browser 181 may be time-out.

In order to prevent this time-out, the MFP browser 181 may send a dummy HTTP request to the Web server 102 periodically. Alternatively, after the scan execution instruction data 604 is received, the MFP browser 181 may send an HTTP request for stopping a timer at a side of the Web server 102, so as to stop clocking for a time-out of the session at the Web server 102 during the scan. In this case, the MFP browser 181 may sends an HTTP request for resuming the timer before or after the format data 604 is transferred.

As described above, in the multi-functional machine 101 according to the embodiment of the present invention, the MFP browser 181 comprehends display information described in an HTML file and a script for controlling functions using specific hardware for the multi-functional machine 101 such as the scanner and the like. Accordingly, by descriptions in the HTML data as text data, it is possible to easily customize the multi-functional machine 101 and also possible to control the specific hardware for generating an image even if a screen is displayed at an operation panel by the HTML data. In addition, since the HTML data are generated or managed by the Web server 102, it is possible to customize a plurality of the multi-functional machines 101 simultaneously by simply making a change at the side of the Web server 102.

Moreover, the MFP browser 181 can conduct a process in accordance with the HTML data downloaded from the Web server 102, and is not required to understand meanings of the display information based on the HTML data. Accordingly, it is possible to realize wealthy versatility and flexibly provide various solutions corresponding to a user environment.

Furthermore, the multi-functional machine 101 is not required to handle the image data formed by scanning the original sheet, and simply embeds the image data into the format data 6044 downloaded from the Web server 102. In this point, versatility is realized.

In the embodiment of the present invention, the HTML data are downloaded from the Web server 102. The HTML data may be stored in the HDD 233 of the multi-function machine 101. The MFP browser 181 may control the multi-functional machine 101 based on the HTML data stored in the multi-functional machine 101. By this configuration, it is possible to satisfy the user needs which do not wish to install the Web server 102. In this case, the MFP browser 181 and a Web server program are operated by separate threads which communicate with each other by a loop back port of a local address (127.0.0.1).

Moreover, in this embodiment of the preset invention, the scan process is described. Alternatively, for example, the MFP browser 181 may be configured to conduct an execution control of a print, a FAX transmission, or a copy based on a script such as doPrint ( ), doFAX ( ), doCopy ( ), and a like, so that it is possible to easily customize for the print, the FAX transmission, or the copy, by descriptions of the HTML data as the text data. Thus, even if a display at the operation panel is conducted by the HTML data, it is possible to control special hardware for forming an image.

The present invention is not limited to the specifically disclosed embodiments, and variations and modifications may be made without departing from the scope of the present invention.

What is claimed is:

1. An image scanning apparatus comprising:
   a display device;
   a scanner configured to scan image data from an original sheet;
   a processor;
   a memory storing one or more programs to be executed by the processor, the one or more programs causing the processor to perform
   sending a HyperText Transfer Protocol (HTTP) request to a predefined Uniform Resource Locator (URL) of an external apparatus;
   displaying, on the display device, a scan condition setting screen allowing to input at least one scan condition setting for scanning the image data by using the scanner, the scan condition setting screen being displayed based on display data sent from the external apparatus in response to the sent HTTP request;
   transferring, to the external apparatus, the at least one scan condition setting input via the scan condition input screen;
   receiving, from the external apparatus, HyperText Markup Language (HTML) data including at least a script including an execution instruction for scanning the image data, the HTML data being generated by the external apparatus based on the transferred scan condition setting; and
   executing scanning the image data using the scanner based on the script included in the received HTML data.

2. The image scanning apparatus according to claim 1, wherein the one or more programs cause the processor to send the HTTP request when the image scanning apparatus is powered on.

3. The image scanning apparatus according to claim 1, wherein,
   when the processor transfers to the external apparatus the at least one scan condition setting, the external apparatus determines whether necessary scan condition settings for performing a scan operation have been transferred, and
   in response to a determination that necessary scan condition settings for performing the scan operation have been transferred, the one or more programs cause the processor to receive HTML data enabling a start button of the image scanning apparatus to be pressed.

4. The image scanning apparatus according to claim 3, wherein, in response to a determination that necessary scan condition settings for performing the scan operation have not been transferred, the one or more programs cause the processor to display, on the display device, the scan condition setting screen based on display data received from the external apparatus.

5. The image scanning apparatus according claim 1, wherein
   the external apparatus stores the at least one scan condition setting transferred by the processor, and
   the HTML data received by the processor includes the at least one scan condition setting together with the script including the execution instruction.

6. The image scanning apparatus according to claim 1, wherein the HTML data received by the processor includes a destination for the scanned image data together with the script including the execution instruction.

7. The image scanning apparatus according to claim 1, wherein the script includes an activation of a function previously defined in the image scanning apparatus and the image scanning apparatus executes the scanning the image data by calling the function.

8. An image scanning method performed by an image scanning apparatus, the image scanning method comprising:
   sending a HyperText Transfer Protocol (HTTP) request to a predefined Uniform Resource Locator (URL) of an external apparatus;
   displaying, on a display device of the image scanning apparatus, a scan condition setting screen allowing to input at least one scan condition setting for scanning image data by using a scanner of the image scanning apparatus, the scan condition setting screen being displayed based on display data sent from the external apparatus in response to the sent HTTP request;
   transferring, to the external apparatus, the at least one scan condition setting input via the scan condition input screen;
   receiving, from the external apparatus, HyperText Markup Language (HTML) data including at least a script including an execution instruction for scanning the image data, the HTML data being generated by the external apparatus based on the transferred scan condition setting; and
   executing scanning the image data using the scanner based on the script included in the received HTML data.

9. The image scanning method according to claim 8, wherein the sending the HTTP request is performed when the image scanning apparatus is powered on.

10. The image scanning method according to claim 8, wherein,
    when the transferring, to the external apparatus, the at least one scan condition setting is performed, the external apparatus determines whether necessary scan condition settings for performing a scan operation have been transferred, and
    the image scanning method further comprises, in response to a determination that necessary scan condition settings for performing the scan operation have been transferred, receiving HTML data enabling a start button of the image scanning apparatus to be pressed.

11. The image scanning method according to claim 10, wherein the image scanning method further comprises, in response to a determination that necessary scan condition settings for performing the scan operation have not been transferred, displaying, on the display device, the scan condition setting screen based on display data received from the external apparatus.

12. The image scanning method according to claim 8, wherein
    the external apparatus stores the transferred at least one scan condition setting, and
    the received HTML data includes the at least one scan condition setting together with the script including the execution instruction.

13. The image scanning method according to claim 8, wherein the received HTML data includes a destination for the scanned image data together with the script including the execution instruction.

14. The image scanning method according to claim 8, wherein the script includes an activation of a function previously defined in the image scanning apparatus and the image scanning apparatus executes the scanning the image data by calling the function.

15. A non-transitory computer-readable storage medium storing computer-readable instructions thereon, which, when executed by an image scanning apparatus, cause the image scanning apparatus to perform an image scanning method comprising:

sending a HyperText Transfer Protocol (HTTP) request to a predefined Uniform Resource Locator (URL) of an external apparatus;

displaying, on a display device of the image scanning apparatus, a scan condition setting screen allowing to input at least one scan condition setting for scanning image data by using a scanner of the image scanning apparatus, the scan condition setting screen being displayed based on display data sent from the external apparatus in response to the sent HTTP request;

transferring, to the external apparatus, the at least one scan condition setting input via the scan condition input screen;

receiving, from the external apparatus, HyperText Markup Language (HTML) data including at least a script including an execution instruction for scanning the image data, the HTML data being generated by the external apparatus based on the transferred scan condition setting; and executing scanning the image data using the scanner based on the script included in the received HTML data.

16. The non-transitory computer-readable storage medium according to claim 15, wherein the sending the HTTP request is performed when the image scanning apparatus is powered on.

17. The non-transitory computer-readable storage medium according to claim 15, wherein, when the transferring, to the external apparatus, the at least one scan condition setting is performed, the external apparatus determines whether necessary scan condition settings for performing a scan operation have been transferred, and the image scanning method further comprises, in response to a determination that necessary scan condition settings for performing the scan operation have been transferred, receiving HTML data enabling a start button of the image scanning apparatus to be pressed.

18. The non-transitory computer-readable storage medium according to claim 17, wherein the image scanning method further comprises, in response to a determination that necessary scan condition settings for performing the scan operation have not been transferred, displaying, on the display device, the scan condition setting screen based on display data received from the external apparatus.

19. The non-transitory computer-readable storage medium according to claim 15, wherein the external apparatus stores the transferred at least one scan condition setting, and the received HTML data includes the at least one scan condition setting together with the script including the execution instruction.

20. The non-transitory computer-readable storage medium according to claim 15, wherein the received HTML data includes a destination for the scanned image data together with the script including the execution instruction.

\* \* \* \* \*

UNITED STATES PATENT AND TRADEMARK OFFICE
CERTIFICATE OF CORRECTION

| | |
|---|---|
| PATENT NO. | : 8,823,992 B2 |
| APPLICATION NO. | : 14/035718 |
| DATED | : September 2, 2014 |
| INVENTOR(S) | : Shohhei Moroi |

Page 1 of 1

It is certified that error appears in the above-identified patent and that said Letters Patent is hereby corrected as shown below:

On the title page, Items (71) and (73), city of residence are incorrect. Items (71) and (73) should read:

--(71) Applicants: Ricoh Company, Ltd., Tokyo (JP)--

--(73) Assignee: Ricoh Company, Ltd., Tokyo (JP)--

Signed and Sealed this
Twenty-third Day of June, 2015

Michelle K. Lee
*Director of the United States Patent and Trademark Office*